United States Patent [19]

Kearns et al.

[11] Patent Number: 5,144,106
[45] Date of Patent: Sep. 1, 1992

[54] MICROWAVE COOKING UTENSIL EMPLOYING TWO DIFFERENT MICROWAVE SUSCEPTORS

[75] Inventors: Joyce M. Kearns, New City, N.Y.; Richard Scarpellino, Ramsey, N.J.

[73] Assignee: Kraft General Foods, Inc., Glenview, Ill.

[21] Appl. No.: 597,984

[22] Filed: Oct. 15, 1990

Related U.S. Application Data

[63] Continuation-in-part of Ser. No. 291,812, Dec. 29, 1988, Pat. No. 4,963,708, which is a continuation of Ser. No. 166,062, Mar. 9, 1988, Pat. No. 4,795,649.

[51] Int. Cl.$^5$ ............................................. H05B 6/80
[52] U.S. Cl. ..................... 219/10.55 E; 219/10.55 F; 426/243; 99/DIG. 14
[58] Field of Search ............... 219/10.55 E, 10.55 F, 219/10.55 R, 10.55 M; 426/107, 234, 241, 243; 99/451, DIG. 14

[56] References Cited

U.S. PATENT DOCUMENTS

| | | | |
|---|---|---|---|
| 4,316,070 | 2/1982 | Prosise et al. | 219/10.55 E |
| 4,439,656 | 3/1984 | Peleg | 219/10.55 E |
| 4,743,726 | 5/1988 | Hughes et al. | 219/10.55 F |
| 4,795,649 | 1/1989 | Kearns et al. | 219/10.55 E |
| 4,864,089 | 9/1989 | Tighe et al. | 219/10.55 E |
| 4,866,232 | 9/1989 | Stone | 219/10.55 E |
| 4,963,708 | 10/1990 | Kearns et al. | 219/10.55 E |
| 4,969,558 | 11/1990 | Fisher | 219/10.55 E X |
| 4,983,798 | 1/1991 | Eckler et al. | 219/10.55 M |

Primary Examiner—Philip H. Leung
Attorney, Agent, or Firm—Thomas A. Marcoux; Thomas R. Savoie; Linn I. Grim

[57] ABSTRACT

The invention relates to a method of cooking or reheating a combustible with microwave energy by utilizing a double-boiler cooking utensil. The double-boiler utensil contains a microwave susceptible liquid within an outer vessel and a cooking oil or fat within an inner vessel with the inner vessel providing conductive heat transfer between the microwave susceptible liquid and the cooking oil or fat. The process involves placing a comestible in the cooking oil or fat within the inner vessel and irradiating the cooking utensil containing the comestible for a period of time effective to cook the comestible. The microwave susceptible liquid when subjected to microwave energy functions to transfer sufficient heat to the cooking oil or fat to maintain a temperature on the surface of the comestible within the range of from 125° C. to 225° C. The improved apparatus also incorporates a solid microwave interactive material in conductive heat transfer contact with the microwave susceptible liquid.

10 Claims, 4 Drawing Sheets

MICROWAVE COOKING UTENSIL EMPLOYING TWO DIFFERENT MICROWAVE SUSCEPTORS

BACKGROUND OF THE INVENTION

This is a continuation-in-part of application Ser. No. 291,812, filed Dec. 29, 1988, now U.S. Pat. No. 4,963,708 which is a continuation of application Ser. No. 166,062 filed Mar. 9, 1988, now U.S. Pat. No. 4,795,649.

FIELD OF THE INVENTION

This invention relates to the microwave cooking of food. More particularly, it relates to microwave cooking at higher temperatures than those conventionally obtained. This invention especially relates to the use of liquids whose dielectric properties permit the microwave cooking of foods at temperatures higher than those conventionally obtained.

DESCRIPTION OF THE PRIOR ART

Microwave ovens for home use have found widespread acceptance. The fact that the cooking and/or reheating of food in the domestic microwave oven is achieved in such relatively short periods of time is probably the principal reason for the high sales of these units in recent years.

Essentially all domestic microwave ovens operate at 2450 MHz. The dielectric properties of food at this frequency parallels those of water which is the principal lossy constituent of food. The absorption of microwave energy by food by the interaction of the dipole water molecule in the microwave energy field results in a localized heating not greatly exceeding 100° C. producing the desired cooking or reheating. Despite the widespread use of microwave ovens, there are several shortcomings to which attention has been directed to increase the utilization of these devices. The uneven absorption of microwave energy by different parts of the same meal placed in the microwave oven results in not all of the separate food components reaching the same temperature. Further, the edges of a particular comestible may be hot while the center may be cold. In addition, the distribution of microwave energy is usually not uniformly distributed throughout the cross section of the oven. Some of these difficulties have been alleviated heretofore by the use of turntables which rotate slowly while the food is subjected to the microwave energy.

Since microwave cooking is dependent upon the absorption of the microwaves which in the case of food means the absorption by water molecules, typical temperatures achieveable in conventional microwave cooking for foods possessing a significant moisture content is approximately 100° C. due to the evaporation of water. Since microwave ovens operate with cold walls, the surface of an article in the oven loses heat to the cool oven walls thereby reducing the surface temperature significantly below that of the temperature obtainable deep within the foodstuff.

Cooking in a microwave is faster than in a conventional thermal oven since the microwave energy has the ability to penetrate deeply into foods and produce heat instantaneously as it penetrates. The conventional thermal oven depends upon the conduction of heat from the surface of the comestible to the interior portions thereof. In microwave cooking the surface temperatures of most moisture-containing foods rarely exceed 100° C. before the inside portion of the food is overcooked, therefore, most foods cooked in a microwave oven lack the brown surface color achieved when using conventional thermal techniques. Thus, breads and pies cooked in a microwave oven have a pale appearance while meats usually have a gray surface appearance when prepared in a microwave oven. The golden brown, crispy texture of roast turkey or chicken, the dark brown appearance of meat roasts and the golden brown crust of pies and cakes are the result of a nonenzymatic browning reactions and/or caramelization. These reactions require temperatures in excess of 125° C. which are not typically obtainable in the microwave oven.

A number of techniques have been utilized heretofore to impart a brown color to comestibles prepared in a microwave oven. In some, browning sauces are utilized to impart the desirable brown color to meats while in others materials are added to cooking utensils which cause an increase in the surface temperature of the comestible being prepared in the microwave oven. U.S. Pat. No. 4,252,832 discloses an aqueous syrup of a melted, carmelized and foamed disaccharide for basting or recipe-inclusion to effect browning of foods cooked in a microwave oven.

By far the more common approach to the problem has been to utilize cooking utensils of various designs whose surfaces include materials designed to be susceptible to heating by microwave radiation thereby causing the surface of the comestible in contact therewith to reach a temperature at which the browning reaction will take place. Among the problems in designing browning utensils are the fact that with some materials susceptible to heating by microwave radiation and under some geometric configurations there is no practical upper limit to the temperature to which they will heat so that with prolonged exposure to microwave energy these materials are subject to thermal runaway due to their non-linear dielectric loss characteristics. However, those microwave absorbing materials which exhibit a Curie temperature theoretically have an upper temperature, of about the Curie temperature, which can be attained when subjected to even prolonged microwave radiation. Thus, a number of browning dishes have incorporated one of these desirable class of materials, ferrites, which absorb energy to their Curie temperature, beyond which power absorption decreases and heating does not continue. (See for example, U.S. Pat. Nos. 2,830,162, 4,266,108 and 4,663,506, which disclose ferrite-containing browning utensils.) Thus, foods in heat exchange contact with surfaces containing ferrites will be, when placed in a microwave oven, subject to temperatures sufficiently above 100° C. to cause a browning and/or a crisping of the surface of the comestible.

Other cooking utensils are designed to provide a variety of surface temperatures so that different portions of a comestible receive different rates of heating. Some surfaces may be transparent to microwave energy thereby remaining cool but permitting the portion of the comestible adjacent thereto to become heated by the microwaves passing therethrough. Other surfaces of a utensil may contain microwave lossy materials which can cause these surfaces to become sufficiently hot to promote the browning reaction of the portion of the comestible in heat transfer relationship with that hot surface. U.S. Pat. No. 4,542,271 incorporates into a microwave cooking utensil a heating matrix absorbent to microwave energy composed of a blend of three plastics having magnetite dispersed therein which is said to provide a fast heating time. Other cooking utensils utilize liquids to achieve desirable results. In U.S. Pat. No. 4,439,656, food is packaged in a metal container which in turn is placed in a non-metallic holder slightly larger than the container. The space between the container and holder is filled with a liquid, such as water, which absorbs microwave energy, thereby uniformly generating heat which is transferred to the surfaces of the sides and bottom of the metal container. The use of water, however, does not generate a sufficiently high temperature to promote the browning reaction. U.S. Pat. No. 4,316,070 discloses a moderator for cooking foods evenly in a microwave oven. The moderator is in the form of a plastic bag having a fluid impervious outer layer. The inner surface of the plastic bag has attached thereto a liquid forming layer which may be a layer of a water-soluble surfactant or an absorbent substrate of paper, tissue, cellulosic film or fabric. The liquid used in conjunction with the film forming layer has dielectric properties which influence the bag's ability to moderate or even out the microwave fields. Preferably, the liquid has a dielectric constant above two and a loss tangent below one. Water is the only liquid material exemplified in the patent although suitable dielectrics disclosed are water, vegetable oil, ethanol and polyols. The purpose of the surfactant is said to modify the dielectric properties of the liquid by decreasing the dielectric constant and increasing the loss tangent. The film forming layer converts the dielectric fluid placed in contact with the layer into a thin liquid film which surrounds the cooking comestible. By cooking the comestible within the disclosed plastic bag, the microwave energy is moderated prior to its interaction with the comestible so as to cause more even cooking of the comestible.

Much of the prior art has been concerned with providing packages for such food products as pizza, popcorn and fruit and meat pies. These packages are designed to be inexpensive so as to permit their one-time use not only for packaging and consumer-purchase of the comestible, but also to serve as the utensil for microwave cooking of the comestible. Browning of pastry dough while providing even heating of the remaining portion of the comestible is achieved in a variety of techniques involving the use of microwave transparent paper and cardboard together with microwave reflective or microwave shielding materials and microwave lossy materials. These latter materials heat up and radiate or conduct heat to adjacent areas. A variety of the microwave materials, also known as microwave interactive materials, may be used. Because of their dielectric properties, these materials absorb a portion of the microwave energy impinging thereon so that the surface of the material heats up. Examples of suitable microwave interactive materials include metalized layers of polyethylene terephthalate or polyester as disclosed in U.S. Pat. Nos. 4,553,010, 4,590,349 and 4,594,492. Typical examples of commercial packaging utilized for microwave use include the container disclosed in U.S. Pat. No. 4,553,010 for Preparing popcorn wherein the container is formed of a bottom panel of paperboard coated with a microwave interactive material of metalized polyethylene terephthalate and the remaining parts of the container are constructed of paperboard which is transparent to the microwave energy. The bottom panel has the microwave reactive material formed on the inner surface thereof in heat transfer relationship with the kernels of popcorn.

A number of prior art patents are devoted to providing a pasteboard or paper container which may be effectively utilized in cooking the pizza contained therein. In U.S. Pat. No. 4,555,605, the package contains a tray, the walls of which are of microwave transparent Paperboard and the top of which, also of paperboard, is provided with a microwave interactive layer which converts microwave energy into heat. The pizza is placed on top of the microwave interactive layer and the combination placed in the microwave oven. The pizza filling will be heated directly by the action of the microwave energy while the dough portion of the pizza will be cooked by the heat transferred to it from the microwave reactive film. U.S. Pat. No. 4,592,914 discloses another type of cook-in container for pizza. The container is made from two separate paperboard blanks, one of which forms an outer package while the other forms an inner food supporting tray. The outer package contains a microwave shielding layer of thin aluminum foil to prevent overcooking of the top portion of the pizza. The outer package also contains a section which is removed prior to insertion of the package into the microwave oven to expose several ventilation holes. The inner food supporting tray serves to support the pizza in an elevated position above the bottom wall of the package and at the same time contains a microwave interactive material formed from a metalized layer of polyester which in the presence of microwaves heats up to brown and crisp the crust of the pizza. With a package designed in this fashion, the pizza filling is cooked to a proper temperature while the pizza crust is cooked and browned without becoming soggy.

U.S. Pat. No. 4,626,641 discloses a microwavable container for fruit or meat pies having crusts. The container includes an outer carton formed from a paperboard blank, and an insert formed from a separate paperboard blank containing a microwave transparent area. The outer carton has its entire inner surface laminated with a crisping means constructed from a metalized polyester for converting microwave energy into heat capable of browning and crisping the surface crust of the pie contained within the container. The second paperboard blank is formed into a container to hold the pie which is formed with an upper crust. The insert includes a microwave transparent area in its bottom panel to admit microwave energy into the bottom of the insert and consequently the bottom of the food product held therein. The insert is otherwise shielded on its side and bottom with a microwave reflective material such as aluminum foil to prevent excessive exposure of the food product to direct microwave energy. In this fashion the upper crust of the pie will be brown and crisp while the contents of the pie will be cooked by receiving a controlled amount of microwave energy. Where the pie is made with crust on the bottoms and the sides, the insert design is modified by lining the insert with the same microwave interactive material as was used in the crisping means. In this fashion the insert will provide a crisping and browning effect to the bottom and side crust of the pie while the upper crisping means browns and crisps the upper crust and the pie contents receives appropriate microwave heat for cooking the contents.

U.S. Pat. No. 3,256,101 is directed to materially reducing the time required to heat food in a microwave oven by extracting part of the water from the food and substituting in its place organic liquids having a significantly lower specific heat capacity and latent heat of fusion than water. Typical liquids for this purpose are said to include fatty oils, such as corn oil, cottonseed oil, peanut oil, safflower oil and glycerol. Substitution of an organic liquid for the water significantly reduced the heating time required for heating the food in a microwave oven and also resulted in a more uniform distribution of microwave heating energy in the food. The benefits achieved by the substitution of organic liquids for water are said to occur because these organic oils have a lower dielectric constant than water and, therefore, absorb microwave energy less readily than water.

It is an object of this invention to provide a means for cooking in a microwave oven at temperatures significantly higher than achieved conventionally. It is another object of this invention to provide liquids for use in preparing comestibles in microwave ovens at temperatures significantly above 100° C.

It is a further object of this invention to provide a process for conducting cooking or reheating in a microwave oven so as to achieve browning and crisping of foods as is conventionally obtained in a thermal oven.

SUMMARY OF THE INVENTION

These and other objects are achieved by means of a microwave susceptible or interactive liquid. In Particular, by maintaining particular microwave susceptible liquids in contact with a comestible while the comestible is subject to microwave energy, a sufficiently high temperature can be achieved to effect browning, crisping and aroma development.

More particularly, this invention relates to a method of cooking or reheating a comestible with microwave energy which comprises:
  (a) placing a double-boiler type cooking utensil in a microwave oven, said utensil containing a microwave susceptible liquid in an outer vessel and a cooking oil or fat within an inner vessel wherein the walls of the inner vessel provide conductive heat transfer between the liquid and cooking oil or fat;
  (b) inserting a comestible which is to be cooked or reheated into the cooking oil or fat within the inner vessel;
  (c) irradiating the comestible with microwave energy for a period of time which is effective to cook or reheat the comestible, said microwave susceptible liquid being effective to transfer sufficient heat to said cooking oil or fat to maintain a temperature on the surface of the comestible in the range of from 125° C. to 225° C. during irradiation with microwave energy.

The invention also relates to an apparatus comprising:
  an inner vessel;
  an outer vessel;
  means for maintaining a space between the outer surface of the bottom of the inner vessel and the inner surface of the outer vessel; and
  a quantity of microwave susceptible liquid placed in said outer vessel wherein said inner vessel is in conductive heat transfer contact with the microwave susceptible liquid contained within the outer vessel, said microwave susceptible liquid is an organic liquid which possesses a high dielectric loss factor as well as a boiling point greater than 150° C.

An improved apparatus over the above-identified apparatus is also disclosed. The improved apparatus additionally contains a solid microwave interactive material in conductive heat transfer contact with the microwave susceptible liquid. This improvement permits the apparatus to reach optimum cooking, frying or reheating temperatures in a shorter period of time.

BRIEF DESCRIPTION OF THE DRAWINGS

FIGS. 5 and 6 are explained in Example 6.

DESCRIPTION OF THE PREFERRED EMBODIMENTS

Figure 1:
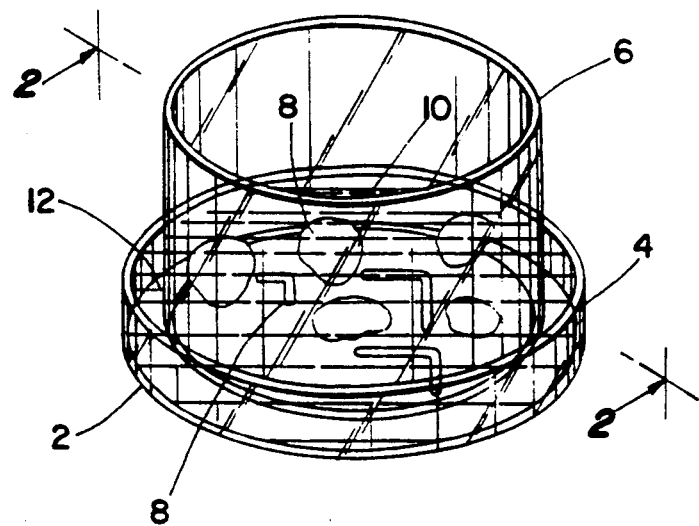
FIG. 1 is an isometric view of a cooking utensil in which the process of the subject invention may be practiced.

The present invention relates to a method of conducting microwave cooking or reheating of the comestible surface at temperatures which will typically result in the browning or crisping of the surface of comestibles and the development of food or cooking aromas which conventionally occur when cooking, baking, roasting or reheating in a thermal oven. In accordance with the present invention, the elevated temperature necessary to initiate the non-enzymatic browning reactions for producing the surface browning of comestibles is obtained in a microwave oven by the use of a microwave susceptible liquid. By a microwave interactive liquid (also known as a microwave susceptible liquid) is meant a liquid that absorbs a portion of the microwave energy impinging on it so that its temperature rises. By maintaining the comestible within the cooking oil or fat contained in the inner vessel of the double boiler in conductive heat transfer contact with the outer vessel containing a microwave susceptible liquid of this invention, a temperature in the range of about 125 to about 225° C., Preferably 150 to 200° C., may be obtained on the surface of the comestible when it is radiated with microwave energy in a microwave oven.

In order to be useful as a microwave interactive liquid, the liquid must be susceptible to microwave radiation to the extent that it will heat up sufficiently and conduct heat to the cooking oil or fat which will in turn maintain the surface of a comestible at a temperature sufficient to achieve surface browning and ideally, aroma development and release. Organic liquids which possess a high dielectric loss factor as well as a high boiling point i.e. greater than 150° C. may be employed. The microwave reactive liquids are preferably selected from the following groups; polyols between $C_2$-$C_6$; polyoxyethylene sorbitan esters i.e. Tweens; sorbitan esters i.e. Spans; acetates of glycerol, i.e., monoacetin, diacetin and triacetin and combinations of liquids representative of two or more of the groups. Most preferred liquids are glycerol and propylene glycol.

It is possible to select one of these liquids or mixtures thereof in order to achieve a particular desirable temperature at the surface of the comestible being cooked.

This invention incorporates the concept of frying along with microwave cooking by employing a "double-boiler" type of cooking utensil. The microwave susceptible liquid is placed in the outer vessel of the double-boiler and a triglyceride-containing cooking oil or fat, which does not heat up rapidly when exposed to microwave energy, is placed in the inner vessel of the double-boiler. Foods merely placed in a cooking oil or fat, and then subjected to microwave energy will not be fried since the vegetable cooking oil is not very susceptible to microwave energy and the oil will not reach frying temperatures when exposed to microwave energy for a reasonable period of time, i.e. 5 to 7 minutes. Furthermore, if the oil is able to reach frying temperatures by longer exposure to microwaves, it will cool down when a comestible is added (in an attempt to fry the comestible) and the oil will again take considerable time to reach frying temperatures. During the time the oil is being heated to reach frying temperatures, the comestible is being cooked internally by the microwaves. Thus the comestible will be overcooked internally before the cooking oil reaches frying temperatures or before frying is completed.

Figure 2:
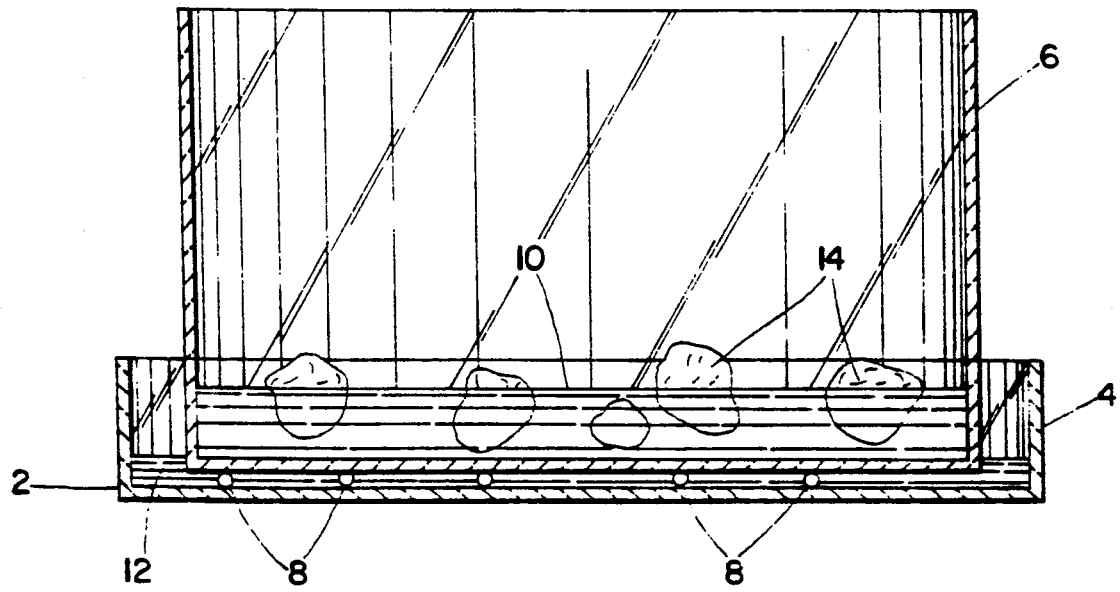
FIG. 2 is an elevation view of the utensil of FIG. 1 along the lines "2—2".

Reference should now be made to FIGS. 1 and 2 which illustrate a version of the "double-boiler" type of utensil 2 which may usefully be employed in the practice of this invention. The same numerals in each of these two drawings are utilized to depict the same elements of the cooking utensil. The utensil consists of an outer rounded vessel 4 having a flat bottom and straight side walls. Vessel 6 having a similar shape but of smaller diameter and taller side wall height than vessel 4 is placed within outer vessel 4 on spacers 8 which maintain a space between the outer surface of the bottom of vessel 6 and the inner surface of outer vessel 4. Both vessels may be composed of materials which are essentially transparent to microwave energy, and inner vessel 6 should be composed of material which permits the rapid transmission of heat. In one embodiment both vessels were composed of heat resistant glass such as Pyrex glass. Spacer 8 may also be composed of the same material as the vessels and may have a circular configuration or comprise short rectangular cylinders of this material. Alternately a one-piece double-boiler apparatus may be constructed wherein the microwave susceptible liquid is permanently sealed between the upper and lower walls of a cooking apparatus. A quantity of triglyceride-containing vegetable cooking oil 10 is placed inside vessel 6. This oil is the type conventionally used for frying comestibles which does not heat up quickly when radiated by microwave energy. The space between outer vessel 4 and inner vessel 6 is filled with a microwave susceptible liquid 12 of the subject invention for example, glycerol.

To utilize cooking utensil 2, it is placed in the microwave oven and subjected to microwave energy typically at a frequency of about 2450 MHz and a power level in the range of about 300 to about 1,000 watts for a period of time to cause the microwave susceptible liquid 12 to heat up sufficient to transmit adequate heat through the walls of vessel 6 to heat the vegetable cooking oil 10 to a temperature sufficient to conduct frying. At this point the door to the microwave oven is opened, a comestible 14, such as breaded chicken filets, is placed in the cooking oil, the oven door is closed and the entire assembly is subjected to microwave energy for a sufficient period of time to cook the comestible. Usually a period of less than one minute is sufficient to adequately cook a small, breaded chicken filets. Since the cooking action is a combination of microwave cooking is deep fried to a golden brown while the interior of the chicken filet is still moist and soft and thoroughly cooked by the action of the microwave energy. By utilizing a device of this type, the desired degree of browning is obtained at the temperatures necessary to effect that appearance; an effect which is not otherwise obtainable in conventional microwave cooking.

Figure 3:
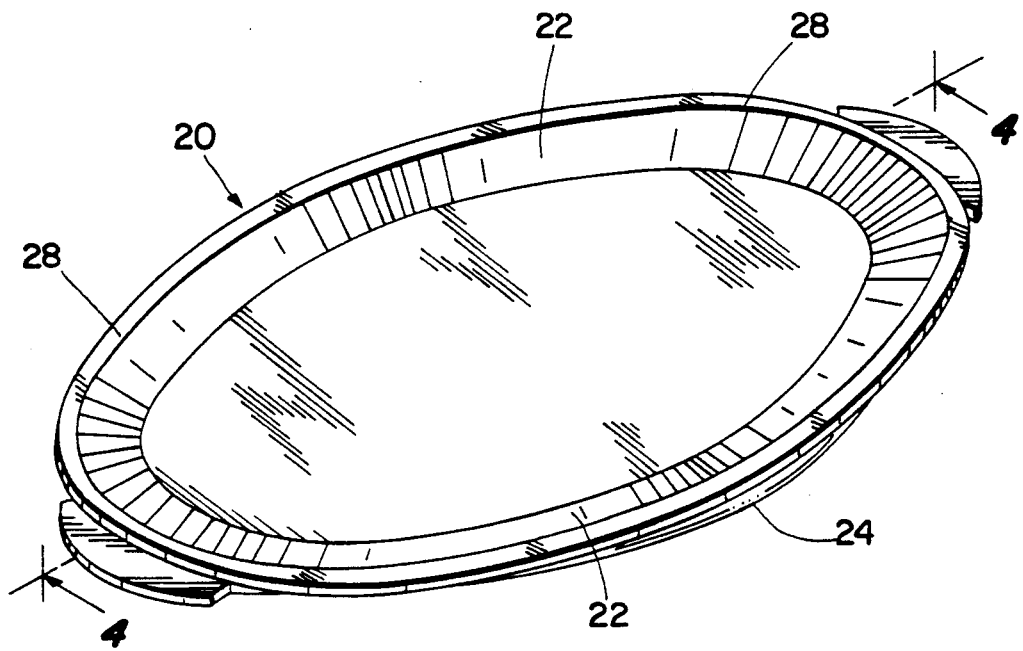
FIG. 3 is an isometric view of a cooking utensil which may be utilized to practice the present invention.
Figure 4:
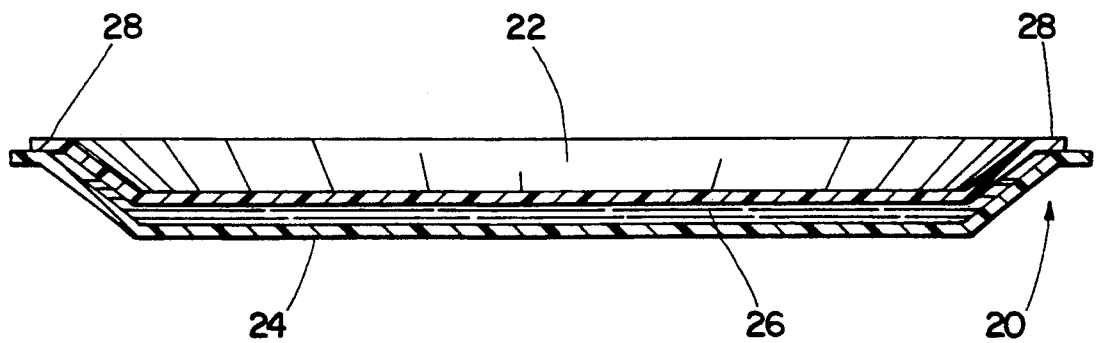
FIG. 4 is an elevation view of the utensil of FIG. 3 along the lines "4—4".

Reference should now be made to FIGS. 3 and 4 which illustrate another version of the "double boiler" type of cooking utensil 20 similar in operation and design to FIGS. 1 and 2 which may usefully be employed to practice the present invention. This version differs from that set forth in FIGS. 1 and 2 in that this version illustrates a one piece cooking utensil where the microwave susceptible liquid 26 is permanently placed in a one piece utensil between a top portion 22 of the utensil and bottom portion 24 of the utensil. The top and bottom portion are joined at a lip 28 of the utensil. Optionally a vent space, not shown, may be incorporated into the utensil design. The numerals utilized in FIGS. 3 and 4 are utilized to depict the same elements of the cooking vessel (however the numerals differ from those set forth in FIGS. 1 and 2). In order to utilize this utensil, a quantity of cooking oil not shown is placed within the open U-shaped top portion of the utensil and the utensil is then utilized in a similar manner as described above. Therefore in its operation, the utensil incorporates an inner vessel represented by the top, open U-shaped component of the utensil which will contain the cooking oil or fat and an outer vessel represented by bottom component of the utensil which contains the microwave susceptible liquid.

Useful cooking oils or fats which are employed in the present invention include such animal and vegetable fats as lard, tallow, butter and mono, di and triglycerides. The cooking oil or fat is of the type used in the art to deep fat fry comestibles. Also in lieu of utilizing a fat or oil per se, a comestible which will exude a fat or oil upon heating such as bacon, salt pork, sausage and oil-coated comestible may be incorporated as a source of cooking oil or fat.

The process employed in the present invention may simply comprise the addition of a comestible to the oil or fat containing inner vessel of the utensil and placing the utensil in a microwave oven and subjecting the combination to microwave energy for a period of time to cook or reheat the comestible. Alternately the double-boiler cooking utensil containing the microwave susceptible liquid within the outer vessel and the cooking oil or fat within the inner vessel may be subjected to microwave radiation without adding the comestible for a period of time effective to preheat the oil or fat to a temperature within the range of from 150 to 180° C. Thereafter, the comestible is added to the hot oil and the combination is placed in a microwave oven.

Although it may be possible to cook comestibles by merely placing them in the microwave susceptible liquid utilized in the practice of this invention, most of the useful liquids impart an undesirable flavor to the comestible. Where this is undesirable, the double-boiler type utensil described above provides an appropriate means to effect deep frying in a microwave oven combined with conventional microwave cooking of the comestible. The taste effect achieved is not obtained by either deep frying or microwave cooking. The "micro-fried" comestible provides a new and most pleasing organoleptic experience.

The present process may be employed to cook the following comestibles: meats, i.e., chicken and veal cutlets; potatoes, i.e., french fried potatoes and potato chips; dough based products, i.e., biscuits, donuts, eggs and combinations of these comestibles.

The present process may be utilized to reheat commestibles which have been totally or partially precooked and then refrigerated or frozen. The main difference in the process compared to cooking is that the comestible is subjected to microwave radiation for a shorter period of time sufficient to heat and/or finish cook the comestible.

The improved cooking apparatus for cooking or reheating comestibles with microwave energy is identical to the apparatus set forth in the parent application, Ser. No. 291,812 issued as U.S. Pat. No. 4,963,708 on Oct. 16, 1990 with the addition of the incorporation of a solid microwave interactive material in conductive heat transfer contact with the microwave susceptible liquid. In this manner the solid microwave interactive material when exposed to microwave radiation transfers the heat which it generates to the microwave susceptible liquid to allow the liquid to heat up at an even quicker rate than it would heat up alone. Therefore the apparatus will reach optimum cooking, frying or reheating temperatures in a shorter period of time.

The solid microwave interactive material is in conductive heat transfer contact with the microwave susceptible liquid. It could be placed in direct contact with the microwave susceptible liquid by placing the solid microwave interactive material on the outer surface of the inner vessel or on the inner surface of the outer vessel. It could also be placed in indirect contact whereby it would transfer the heat by conduction (through the apparatus) by placing the solid microwave interactive material on the inner surface of the inner vessel (where it could directly contact the comestible) or on the outer surface of the outer vessel (where it could directly contact the floor of the microwave oven when the apparatus is placed into the microwave oven).

The solid microwave interactive material can be any one of the following materials: a thin layer of an electrically conductive material such as an elemental metal or metal oxide which is deposited by a vacuum vapor deposition. This technology is set forth for example in U.S. Pat. Nos. 4,641,005 and 4,878,765 which are herein incorporated by reference. Another material is produced by printing an ink containing conductive and semiconductive substances on a substrate. The conductive and semiconductive substances comprise metallic particles such as aluminum, copper, gold, tin, zinc, silver; metallic oxides and carbon particles such as natural and synthetic graphite particles and carbon black particles. Examples of this technology are found in EPO Patent Application 0 276 654, U.S. Pat. Nos. 4,864,089 and 4,914,266 which are herein incorporated by reference. If the conductive ink was utilized it could be applied to a surface of either the inner or outer surface of the inner or outer vessels. Alternatively more than one surface could be coated with the conductive inks. If a metallized film were used it could be bonded to the vessels or a vacuum deposited film can be placed between the inner and outer vessel. An additional solid microwave interactive material which may be incorporated into the improved microwave apparatus is an activated amphoteric ceramic material which is set forth in U.S. Pat. No. 4,818,831 which is herein incorporated by reference.

The following examples illustrate the practice of this invention.

EXAMPLE 1

A series of comestibles were prepared in a microwave oven utilizing the "double-boiler" vessel depicted in FIGS. 1 and 2 and described hereinabove. A Pyrex Petri Dish was utilized as the outer vessel and a 12.5 cm crystallizing dish was utilized as the inner vessel, the two dishes were separated from each other by a 1 mm thick capillary cylinder. Approximately 50 g. of triglyceride vegetable cooking oil was placed in the inner vessel of the utensil and approximately 20 g. of glycerol was placed in the annular space surrounding the inner vessel (space between the inner and outer vessels). The assembled utensil was placed in a microwave oven and the oven was energized for approximately 3 minutes which was sufficient to heat the glycerol and the cooking oil to a temperature of approximately 180° C. In a series of three cooking runs, the following materials were cooked for the indicated periods of time:

1. An uncooked Pillsbury brand buttermilk biscuit was placed in the hot vegetable cooking oil, the microwave oven door was closed and the switch energized to subject the oven contents to microwave energy (at the high power setting). After a time period of 30 seconds, the biscuit was turned over and cooked for an additional 30 seconds after which it was removed from the cooking oil. The exterior surface was light brown in color and upon breaking the biscuit, the interior of the biscuit appeared to be cooked. When eaten, the biscuit had the flavor and all the organoleptic qualities of a baked buttermilk biscuit.
2. Several pieces of chicken cutlets were breaded and placed in the hot cooking oil of the double-boiler utensil. The utensil was placed in a microwave oven which was energized (at the high power setting) for approximately 45 seconds (30 seconds on one side and 15 seconds on the other, after the piece was turned over). Upon removal from the oven, the exterior of the chicken filet had a crispy, golden brown appearance, while the interior of the filet was thoroughly cooked and moist. The eating qualities of the cooked filet gave a flavor of cooked chicken which was a pleasant combination of roasted and deep-fried chicken.
3. Several raw potatoes were sliced into pieces suitable for the preparation of french steak fries. The potato slices were placed in the hot cooking oil of the "double-boiler" utensil and the inner vessel containing the fries was covered with a microwave reflective material such as aluminum foil which functioned to reduce the microwave energy available to cook the potatoes. Thereafter the "double boiler" utensil was placed in the microwave oven which was energized for approximately 3 to 4 minutes on the high power setting. The shielding by aluminum foil allowed the potatoes to remain in the hot oil for a sufficiently long period of time to cause browning on the surface while maintaining a soft interior. The exterior of the cooked potatoes had a light brown crispy appearance and their interior appeared fully cooked. When eaten, the cooked potatoes had the flavor and organoleptic properties of french fried potatoes prepared in a deep vegetable oil frier.

EXAMPLE 2

Potato crisps similar to commercially produced potato chips were produced utilizing a disposable double-boiler apparatus which consisted of an outer vessel made out of filled polyester and an inner vessel which is identical in its size and composition to the outer vessel. The inner vessel is tightly fit within the outer vessel. The bottom of the inner vessel had a small protruding ridge which functioned as a spacer between the inner and outer vessels. The space between the two snugly fit vessels was filled with 15 g. of glycerol. Inside the inner vessel 50 g of Wesson brand vegetable oil was placed. The utensil containing the glycerol and oil was placed in a microwave oven on the high power setting for 2 to 3 minutes. Russet potatoes were cut producing round slices approximately 1 to 2 mm. thick. The potato slices were added to the hot oil and the apparatus was again subject to microwave radiation at the high Power setting for 3½ to 4 minutes. The potato crisps were then removed from the oil and were placed on paper towels for drainage. The potato pieces were an attractive light brown color and were crisp possessing a pleasant deep fried taste.

Alternatively, the potato slices can be browned and crisped without preheating the oil (by placing the utensil without potato slices containing therein in the microwave). In this instance the potato slices can be produced by placing them in the room temperature oil within the utensil and placing the utensil in the microwave at the high power setting for 4½ to 5 minutes.

EXAMPLE 3

The disposable double-boiler apparatus described in Example 2 was utilized to prepare a fried egg. In this instance 15 g. of glycerol and 40 g. of oil were utilized to produce the double-boiler apparatus. The apparatus was placed in the microwave oven at the high power setting for 2 to 3 minutes to preheat the oil. An egg was cracked, placed into a saucer and the yolk was pierced with a needle 3 or 4 times. Thereafter the egg was placed into the preheated apparatus and the apparatus was subjected to microwave radiation at the high power setting for approximately 45 seconds. The fried egg produced was similar in organoleptic character and appearance to a fried egg prepared in a frying pan.

EXAMPLE 4

Bacon and eggs were cooked in the disposable double-boiler cooking utensil previously described in Example 2. The following modifications were made: 15 g. of glycerol was placed in the space between the outer and inner vessels but no liquid was poured in the inner vessel. Instead bacon was used as a source of hard fat. Two strips of regular cut bacon was placed in the inner vessel of the utensil and the utensil was placed into the microwave oven and cooked on the high power setting for 1 to 1½ minutes. During cooking, the bacon exuded sufficient fat to serve as a vehicle to cook the egg. Thereafter an egg was cracked, the yolk pierced and the pierced egg was placed into the bacon fat in the inner vessel of the utensil. The utensil was then placed in a microwave oven and was subjected to microwave radiation at the high power setting for 45 to 60 seconds to produce a bacon and egg breakfast.

EXAMPLE 5

This example demonstrates the use of the present process to reheat comestibles which have been pre-cooked and frozen. The disposable double boiler cooking utensil previously described in Example 2 was utilized. Fifteen grams of glycerol was placed between the two vessels and a thin layer of oil (measuring approximately 15 to 20 grams) was placed into the inner vessel. The utensil containing the glycerol and oil was preheated by placing it in a microwave oven on the high power setting for two minutes. Two pieces of prefried and frozen chicken cutlets were placed in the hot oil and the combination was subjected to microwave radiation (at the high setting) for 30 to 45 seconds (depending on the sizes of the cutlets). Thereafter the cutlets were turned and the combination subjected to microwave radiation for an additional 30 to 45 seconds. The results were pieces of chicken that had the organoleptic qualities of freshly prepared and fried chicken cutlets. The chicken cutlets possessed a hot, moist interior and a crispy, brown exterior.

EXAMPLE 6

Figure 5:
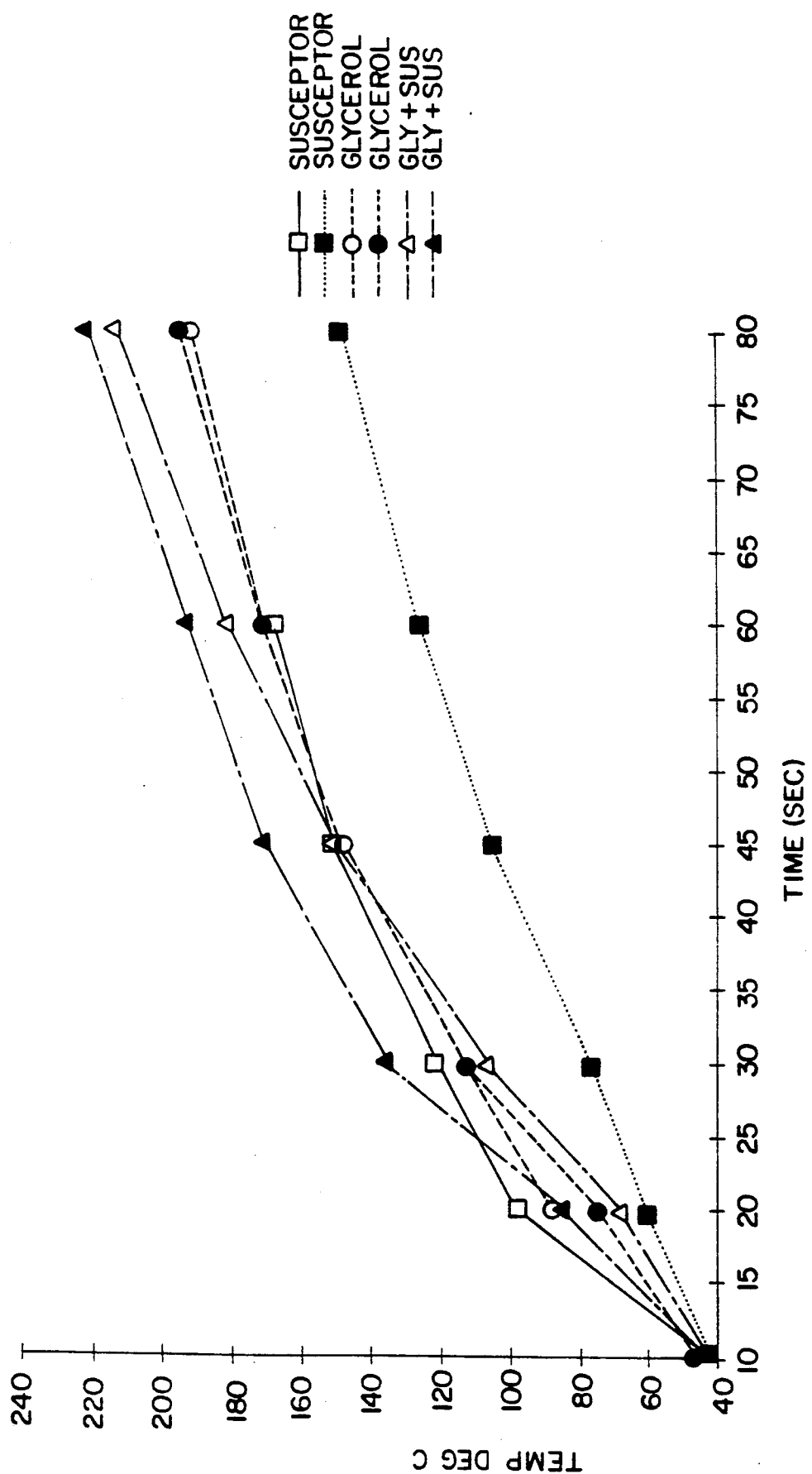
FIG. 5 is a graph of surface temperature of the cooking surface versus time during exposure to microwave radiation of the microwave apparatus containing glycerol only, a similar apparatus with a solid microwave interactive material, and a microwave apparatus containing both glycerol and solid microwave interactive material.

A double-boiler apparatus similar to that depicted in FIGS. 3 and 4 (with the exception that the inner and outer vessels are not joined at lip 28 to form a one piece cooking utensil) was modified to produce an improved apparatus which was tested against the original apparatus containing glycerol and an additional prototype which employed a solid microwave interactive material without the incorporation of glycerol. The apparatus consisted of two oval filled thermoset polyester trays, the overall dimensions of which are approximately 10.5 by 6.75 inches. Three types of apparatuses were tested. The first consisted of the modified apparatus depicted in FIGS. 3 and 4 where 30 grams of glycerol is placed between the two trays. The second consisted of an apparatus containing a solid microwave interactive material specifically a piece of vacuum deposited aluminum susceptor board (hereinafter referred to in this Example and in FIGS. 5 and 6 as susceptor) cut to fit between the inner tray (vessel) and the outer tray but with no glycerol. The third consisted of an apparatus containing the susceptor placed in the same location as in the second apparatus and also 30 grams of glycerol between the inner and outer trays. In order to achieve the most uniformity, the conductivity of the susceptor used ranged from 8.5 to 9.9 mmho/sq. The apparatus was heated for 1.5 min. in a household microwave oven on high power and the surface temperatures (the inner surface of the inner tray) recorded on film with the use of a Hughes infrared camera. The average surface temperature of the cooking surface was then determined with the TIMS software (Probeye Thermal Image Management System produced by Hughes Aircraft Company) and plotted vs. time. FIG. 5 demonstrates that glycerol with susceptor caused the fastest rate of surface heating and higher temperatures than the glycerol alone; the susceptor alone was the slowest and also gave the most variable results.

Figure 6:
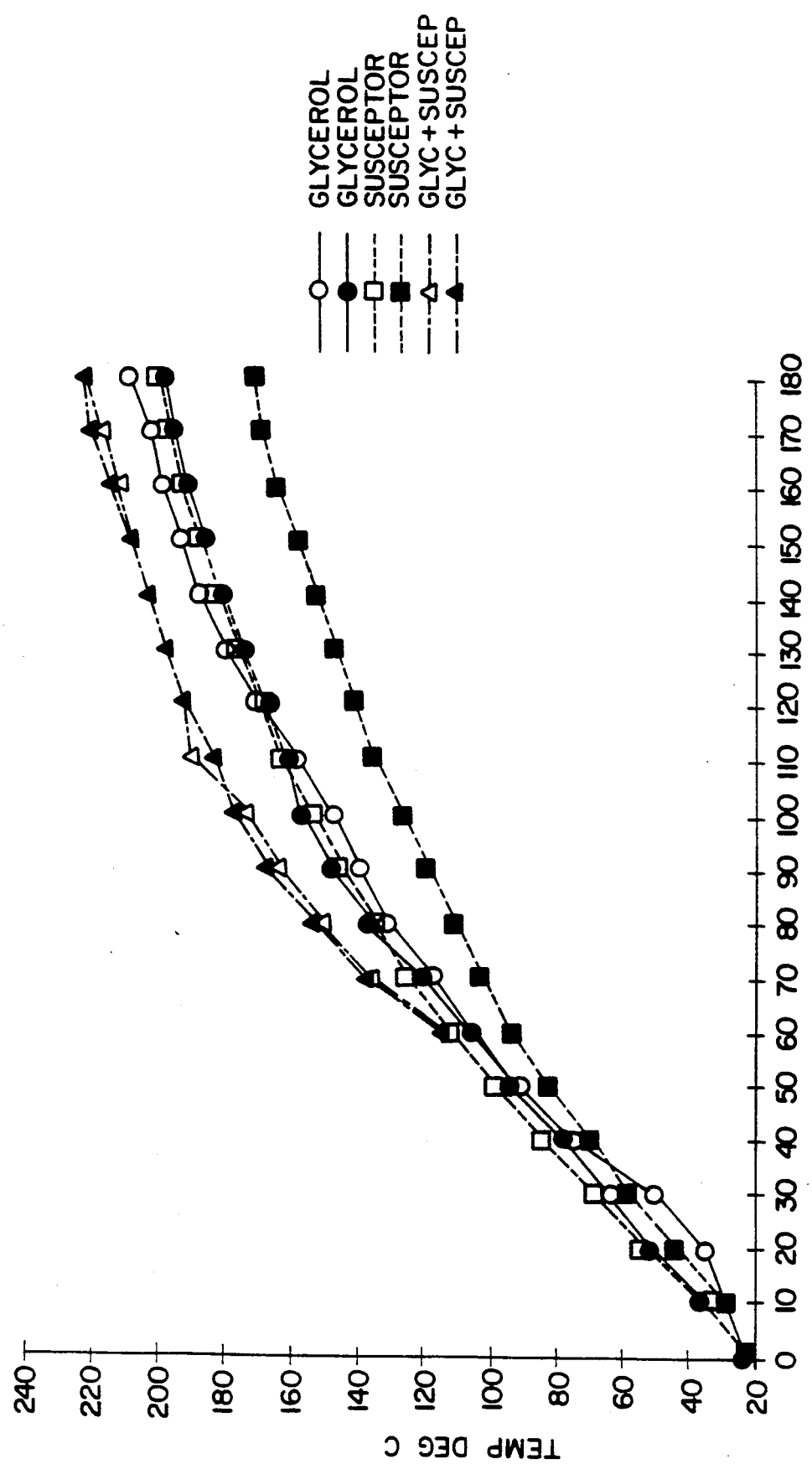
FIG. 6 is a graph of the temperature of oil contained within the inner vessel of the same three apparatuses previously tested in FIG. 5 versus time during exposure to microwave radiation. The details of the results set forth in both

The rate of heating of oil in the apparatuses was then determined. A thin layer of Wesson Oil (0.4 cm in depth——50 grams) was placed in the inner surface of the inner vessel and the apparatus with oil was heated for a period of three minutes. As seen in FIG. 6 the susceptor and glycerol combination reached the highest temperatures followed by the glycerol alone; the susceptor alone was the slowest to heat the oil with the most variability between probes and runs.

The microwave time necessary for all the probes across the three apparatuses to reach temperatures high enough to begin frying of foodstuffs (165° C.) when a thin layer of oil was placed on the cooking surface was approximately 100 seconds when glycerol and susceptor was used; 120 to 130 seconds for glycerol alone and 140 to 180 seconds for the susceptor alone.

From these results, it is concluded that the use of a susceptor (solid microwave interactive material) with the glycerol in the cooking apparatus will give a measurable advantage to the surface heating rate. Temperatures in the apparatus will be higher, faster, resulting in a better prepared foodstuff.

We claim:

1. A cooking utensil for cooking or reheating comestibles with microwave energy comprising:
   an inner vessel;
   an outer vessel;
   means for maintaining a space between the outer surface of the bottom of the inner vessel and the inner surface of the outer vessel;
   a quantity of a first microwave susceptible liquid placed in said outer vessel wherein said inner vessel is in conductive heat transfer contact with the microwave susceptible liquid contained within the outer vessel, wherein said first microwave susceptible liquid is an organic liquid which possesses a high dielectric loss factor as well as a boiling point greater than 150° C.; and
   a solid second microwave interactive material in conductive heat transfer contact with the microwave susceptible liquid said first microwave susceptible liquid and said second microwave interactive material effective to enable said cooking utensil to reach optimum cooking, frying or reheating temperatures in a shorter period of time than either said first liquid or second material alone.

2. The cooking utensil of claim 1 wherein the microwave susceptible liquid is selected from the group consisting of polyols between $C_2$–$C_6$, polyoxyethylene sorbitan esters, sorbitan esters, acetates of glycerol and combinations thereof.

3. The cooking utensil of claim 2 wherein the microwave susceptible liquid is selected from the group consisting of glycerol, propylene glycol and combinations thereof.

4. The cooking utensil of claim 1 wherein the microwave susceptible liquid is permanently sealed between the inner and outer vessels.

5. The cooking utensil of claim 1 wherein the solid microwave interactive material comprises a thin layer of an electrically conductive material.

6. The cooking utensil of claim 5 wherein the electrically conductive material is deposited by vacuum vapor deposition.

7. The cooking utensil of claim 1 wherein the solid microwave interactive material comprises a conductive ink containing conductive and semiconductive substances.

8. The cooking utensil of claim 1 wherein the solid microwave interactive material comprises an activated amphoteric ceramic material.

9. A cooking utensil for cooking or reheating comestibles with microwave energy comprising:
   an inner vessel;
   an outer vessel;
   means for maintaining a space between the outer surface of the bottom of the inner vessel and the inner surface of the outer vessel;
   a quantity of a first microwave susceptible liquid placed in said outer vessel wherein said inner vessel is in conductive heat transfer contact with the microwave susceptible liquid contained within the outer vessel, wherein said first microwave susceptible liquid is an organic liquid which possesses a high dielectric loss factor as well as a boiling point greater than 150° C.; and
   a solid second microwave interactive material in conductive heat transfer contact with the first microwave susceptible liquid, said solid second microwave interactive material in direct contact with the outer surface of the inner vessel and/or in direct contact with the inner surface of the outer vessel, said first microwave susceptible liquid and said second microwave interactive material effective to enable said cooking utensil to reach optimum cooking, frying or reheating temperature in a shorter period of time than either said first liquid or second material alone.

10. A cooking utensil for cooking or reheating comestibles with microwave energy comprising:
    an inner vessel;
    an outer vessel;
    means for maintaining a space between the outer surface of the bottom of the inner vessel and the inner surface of the outer vessel;
    a quantity of a first microwave susceptible liquid placed in said outer vessel wherein said inner vessel is in conductive heat transfer contact with the microwave susceptible liquid contained within the outer vessel, wherein said first microwave susceptible liquid is an organic liquid which possesses a high dielectric loss factor as well as a boiling point greater than 150° C.; and
    a solid second microwave interactive material applied to the surface of the inner and/or outer vessel said solid second microwave interactive material is placed in direct contact with the inner surface of the inner vessel and/or on the outer surface of the outer vessel, said first microwave susceptible liquid said second microwave interactive material effective to enable said cooking utensil to reach optimum cooking, frying or reheating temperature in a shorter period of time than either said first liquid or second material alone.

* * * * *